US008660702B2

(12) United States Patent
Raghavachari (10) Patent No.: US 8,660,702 B2
(45) Date of Patent: Feb. 25, 2014

(54) CENTRAL COOLING AND CIRCULATION ENERGY MANAGEMENT CONTROL SYSTEM

(75) Inventor: Sridharan Raghavachari, Franklin, WI (US)

(73) Assignee: Online Energy Manager LLC, Paoli, PA (US)

( * ) Notice: Subject to any disclaimer, the term of this patent is extended or adjusted under 35 U.S.C. 154(b) by 555 days.

(21) Appl. No.: 12/893,520

(22) Filed: Sep. 29, 2010

(65) Prior Publication Data

US 2012/0078424 A1 Mar. 29, 2012

(51) Int. Cl.
*G05B 23/00* (2006.01)

(52) U.S. Cl.
USPC ........................................................ 700/276

(58) Field of Classification Search
USPC ........................................................ 700/276
See application file for complete search history.

(56) References Cited

U.S. PATENT DOCUMENTS

| | | | |
|---|---|---|---|
| 4,642,998 A | 2/1987 | Kang et al. | |
| 5,632,146 A | 5/1997 | Foss et al. | |
| 5,946,926 A | 9/1999 | Hartman | |
| 5,963,458 A * | 10/1999 | Cascia | 700/300 |
| 6,142,740 A | 11/2000 | Connell | |
| 6,233,954 B1 | 5/2001 | Mehaffey et al. | |
| 6,352,106 B1 | 3/2002 | Hartman | |
| 6,394,120 B1 | 5/2002 | Wichert | |
| 6,449,504 B1 | 9/2002 | Conley et al. | |
| 6,652,240 B2 | 11/2003 | Wichert | |
| 6,718,779 B1 * | 4/2004 | Henry | 62/183 |
| 6,732,540 B2 * | 5/2004 | Sugihara et al. | 62/177 |
| 6,860,103 B2 | 3/2005 | Raghavachari | |
| 7,058,477 B1 * | 6/2006 | Rosen | 700/277 |
| 7,174,732 B2 * | 2/2007 | Taniguchi et al. | 62/183 |
| 7,664,573 B2 * | 2/2010 | Ahmed | 700/276 |
| 7,908,117 B2 * | 3/2011 | Steinberg et al. | 702/182 |
| 2010/0076605 A1 * | 3/2010 | Harrod et al. | 700/276 |

FOREIGN PATENT DOCUMENTS

WO WO0019105 A1 4/2000

OTHER PUBLICATIONS

Nadeem, "Evaluation of Overall Chiller Performance Characteristics" Air Conditioning and Refrigeration Journal Issue: Jul.-Sep. 2001—http://www.ishrae.in/journals/2001july/article04.html.
Honeywell Inc., "XCEED Compressed Air Control System", 1999, 1 page brochure.
Honeywell International, "XCEED Compressed Air System Solutions", Installation Instruction & Maintenance Manual, Jan. 1, 2001, pp. 1-68.

* cited by examiner

*Primary Examiner* — Mohammad Ali
*Assistant Examiner* — Sivalingam Sivanesan
(74) *Attorney, Agent, or Firm* — David D. Brush; Westman, Champlin & Koehler, P.A.

(57) ABSTRACT

A novel central cooling and circulation energy management control system is provided, including an energy management controller device, a central cooling system, and associated methods, according to various embodiments. In one illustrative embodiment, a central cooling energy management controller device includes one or more signal connections, one or more electronic memory elements, and one or more processors. The controller device has access to resources that are either stored on the electronic memory elements or are accessible via the signal connections. The resources include an equipment data table, an equipment and operational configuration table, an operational efficiency matrix, and executable instructions. The processor determines operational control signals for energy-efficient operation of a central cooling system, based on sensor input from the central cooling system, and on data from the equipment data table, the equipment and operational configuration table, and the operational efficiency matrix; and provides the operational control signals via the signal connections.

15 Claims, 6 Drawing Sheets

CENTRAL COOLING AND CIRCULATION ENERGY MANAGEMENT CONTROL SYSTEM

BACKGROUND

Heating, ventilation, and air conditioning (HVAC) systems are installed in commercial and industrial buildings to condition the space inside to temperatures comfortable and/or suitable to the occupants (e.g. human beings or animals) or equipment (e.g. medical equipment, computers etc.) inside. HVAC systems may include central cooling and circulation systems.

The discussion above is merely provided for general background information and is not intended to be used as an aid in determining the scope of the claimed subject matter.

SUMMARY

A novel central cooling and circulation energy management control system is provided, including an energy management controller device, a central cooling system, and associated methods, according to various embodiments. In one illustrative embodiment, a central cooling energy management controller device includes one or more signal connections, one or more electronic memory elements, and one or more processors. The controller device has access to resources that are either stored on the electronic memory elements or are accessible via the signal connections. The resources include an equipment data table, an equipment and operational configuration table, an operational efficiency matrix, and executable instructions. The processor determines operational control signals for energy-efficient operation of a central cooling system, based on sensor input from the central cooling system, and on data from the equipment data table, the equipment and operational configuration table, and the operational efficiency matrix; and provides the operational control signals via the signal connections.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating principles of various illustrative embodiments.

DETAILED DESCRIPTION

Figure 1:
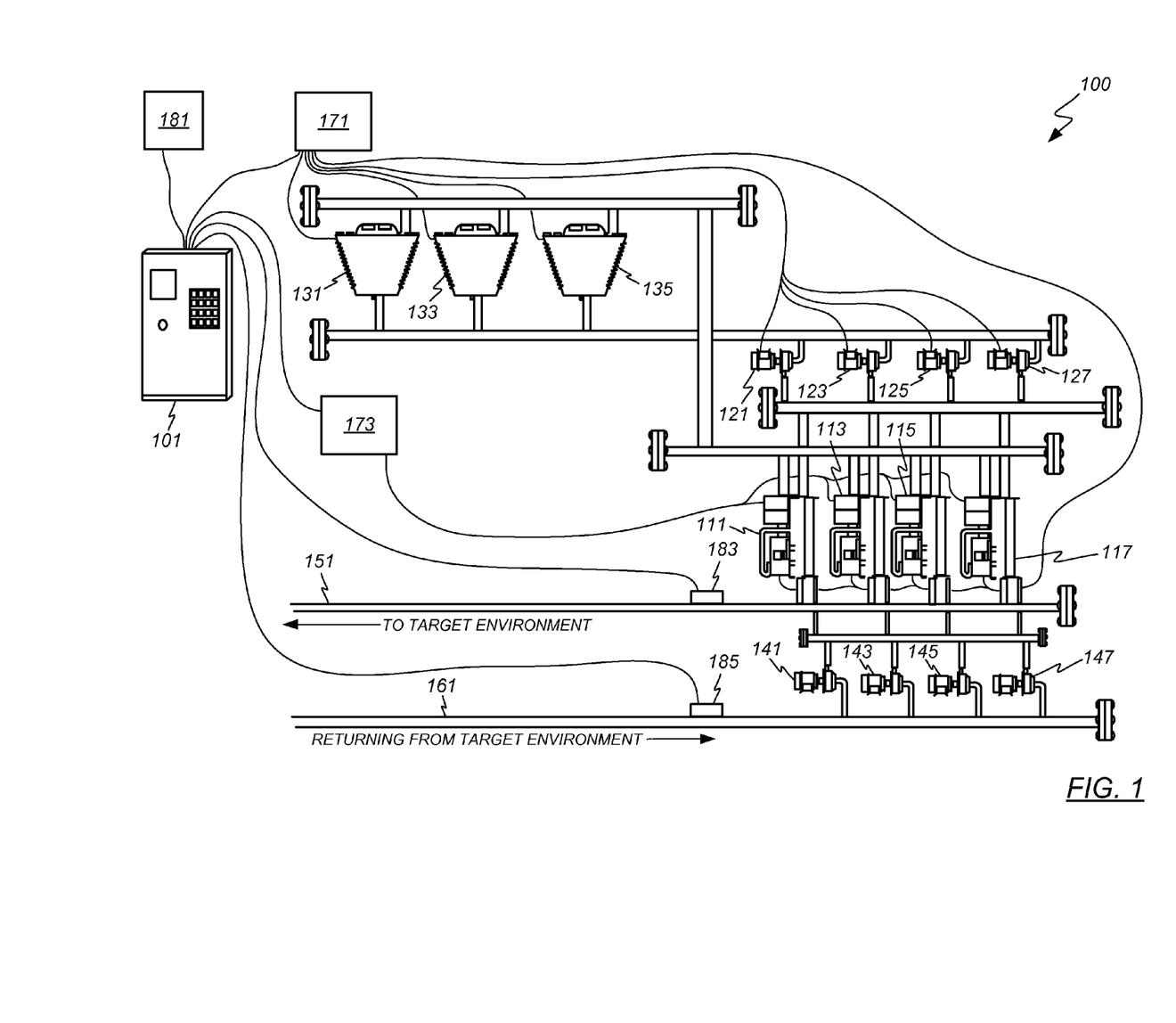
FIG. 1 depicts a central cooling and circulation system with an energy management controller device, according to an illustrative embodiment.

FIG. 1 depicts a central cooling and circulation system 100, or more simply referred to as central cooling system 100, with central cooling energy management controller device 101, in accordance with an illustrative embodiment. As some illustrative aspects of the example of FIG. 1, central cooling energy management controller device 101, or more simply referred to as energy management controller device 101 or controller device 101, generally accepts various inputs from different system components and sensors, processes those inputs together with data stored on the controller device, and generates output control signals that are sent to different system components to control their functioning to achieve desired cooling performance in an energy-efficient manner.

Whereas many prior art controls focus on meeting user-selected cooling requirements in a central cooling system with little or no sophistication in optimizing for energy efficiency, one illustrative advantage of central cooling energy management controller device 101 includes both delivering user-selected cooling performance and actively optimizing for energy efficiency in delivering that cooling performance in a central cooling system, in one illustrative embodiment.

Various inventive and advantageous features of energy management controller device 101 and a cooling system that includes energy management controller device 101 may be better appreciated in the context of the workings of central cooling and circulation system 100. Various illustrative aspects of central cooling system 100 of the example of FIG. 1, as well as some other features of different embodiments, include the following. Along with energy management controller device 101, central cooling and circulation system 100 also includes chillers 111, 113, 115, and 117; condenser water pumps 121, 123, 125, and 127; cooling towers 131, 133, and 135; and chilled water pumps 141, 143, 145, and 147. These components are operably connected with piping as shown in FIG. 1.

Each of the chillers 111, 113, 115, and 117 includes a refrigerant gas compressor, an evaporator, a condenser, and an expansion valve, in this illustrative embodiment. The evaporators in each of chillers 111, 113, 115, and 117 use refrigerant liquid to transfer the cooling effect to a circulating heat transfer medium, such as chilled water. The circulating heat transfer medium circulates among a refrigerant subsystem, including chillers 111, 113, 115, and 117, condenser water pumps 121, 123, 125, and 127, and cooling towers 131, 133, and 135.

Correspondingly, the circulating heat transfer medium circulates among a chilled heat transfer circulation subsystem, in which the chilled heat transfer circulation medium flows from chillers 111, 113, 115, and 117, along chilled water outgoing header 151 which conducts the circulating heat transfer medium to a target environment 199 to be cooled, and back from a target environment along chilled water return header 161 and chilled water pumps 141, 143, 145, and 147. The target environment may be an apartment building, a hotel, a hospital, an industrial facility, an office building, a shopping mall, or any other substantial structure or collection of structures in need of temperature control, in various embodiments.

Condenser water pumps 121, 123, 125, and 127 and chilled water pumps 141, 143, 145, and 147 are discussed in terms of water, as an illustrative example only, while any of a variety of other refrigerant mediums may be used with the chilled water circulation subsystem and condenser fluid circulation pumps in other embodiments, and any of a variety of other chilled heat transfer circulation mediums and chilled heat transfer circulation pumps may be used in various embodiments.

For example, either or both of the refrigerant medium and the heat transfer medium may include any of refrigerant, water, brine solutions, glycol solutions, or other types of medium fluids in various embodiments. Water may be more inexpensive while other solutions may have other advantages in terms of specific heat, interaction with system components, and so forth, and different mediums may be more suitable in different applications. The fluid mediums may be discussed or referred to in terms of water in this disclosure, with the understanding that this is an example used for convenience and not by way of limitation, and do not restrict any aspects of the disclosure from other alternatives in various embodiments.

In this illustrative embodiment, each evaporator uses indirect expansion cooling, so that the cold refrigerant surrounds heat transfer coil bundles in the evaporator part of the chiller. The cold refrigerant transfers heat away from and cools the heat transfer coil bundles and a heat transfer medium flowing through the coils.

In other embodiments, components using direction expansion cooling may also be used. In direct expansion, the cold refrigerant contained inside the cooling coil tubes removes the heat from the air circulated inside the conditioned space directly, thereby effecting the required cooling of the air. Direct expansion cooling is often applied for window or split type of air conditioners. Systems of the present disclosure may include components that use indirect expansion cooling, direct expansion cooling, or a mixture of both types of cooling equipment, for example.

The heat transfer medium thus cooled is circulated to cooling transfer units installed at various strategic locations of the building or buildings being cooled. Such cooling transfer units may include air handling units (AHU), air coil units (ACU), treated fresh air (TFA) units, or other components, or any combination thereof, in different embodiments. The circulating medium inside the tubes or other features of the cooling transfer units cools the air passing outside the tubes, thus cooling the air inside the conditioned space, in this illustrative embodiment. Additional features such as fans may be used at or near the strategic locations of the cooling transfer units, to further facilitate the delivery and circulation of the cooled air in the space to be cooled within the target environment, according to various embodiments.

In various embodiments, the liquid refrigerant may vaporize to gaseous form, thereby picking up the heat from the medium, and transferring heat away from the conditioned space. The vaporized liquid then passes through the refrigerant compressor where the pressure of the vaporized gas is increased to saturation or superheated level to enable condensation back to liquid form at ambient conditions. Water or atmospheric air circulating on the condenser, on the other side of the heat exchanger, cools and condenses the compressed gas to liquid form for recirculation.

In a system such as central cooling and circulation system 100 of FIG. 1 that uses indirect expansion, the hot water from the condenser is cooled in one or more of cooling towers 131, 133, 135 where ambient air takes away the heat from the condenser water, enabling recirculation of the condenser water back to chillers 111, 113, 115, 117. In other embodiments using direct expansion cooling components, the hot air from the condenser goes directly to the atmosphere. In either case, the heat from inside is removed by the saturated water vapor in the ambient air as latent heat of vaporization.

In an illustrative central air conditioning system, the energy consumption is proportional to the following: overall supply side energy efficiency, ambient temperature and humidity conditions, and patterns of user demand. Overall supply side energy efficiency may be measured in terms of energy versus cooling load, for example in units of kilowatt-hours per ton or "kWh/Ton", also referred to as IkW/ton. The overall energy consumed of all energy consuming equipment is measured in IkW, while the cooling load demand is measured in tons. The less energy that can be expended for the same cooling load, the more energy-efficiently the cooling system is functioning. A controller device that manages a central cooling system to induce any reduction in energy consumption per unit of cooling load provided may be considered to provide for energy-efficient operation of that central cooling system, or to improve the energy efficiency of the central cooling system.

Patterns of user demand are dependent on a variety of influences including human factors, equipment, and building dimensions. Various embodiments disclosed herein provide improvements in the supply side energy efficiency.

Figure 2:
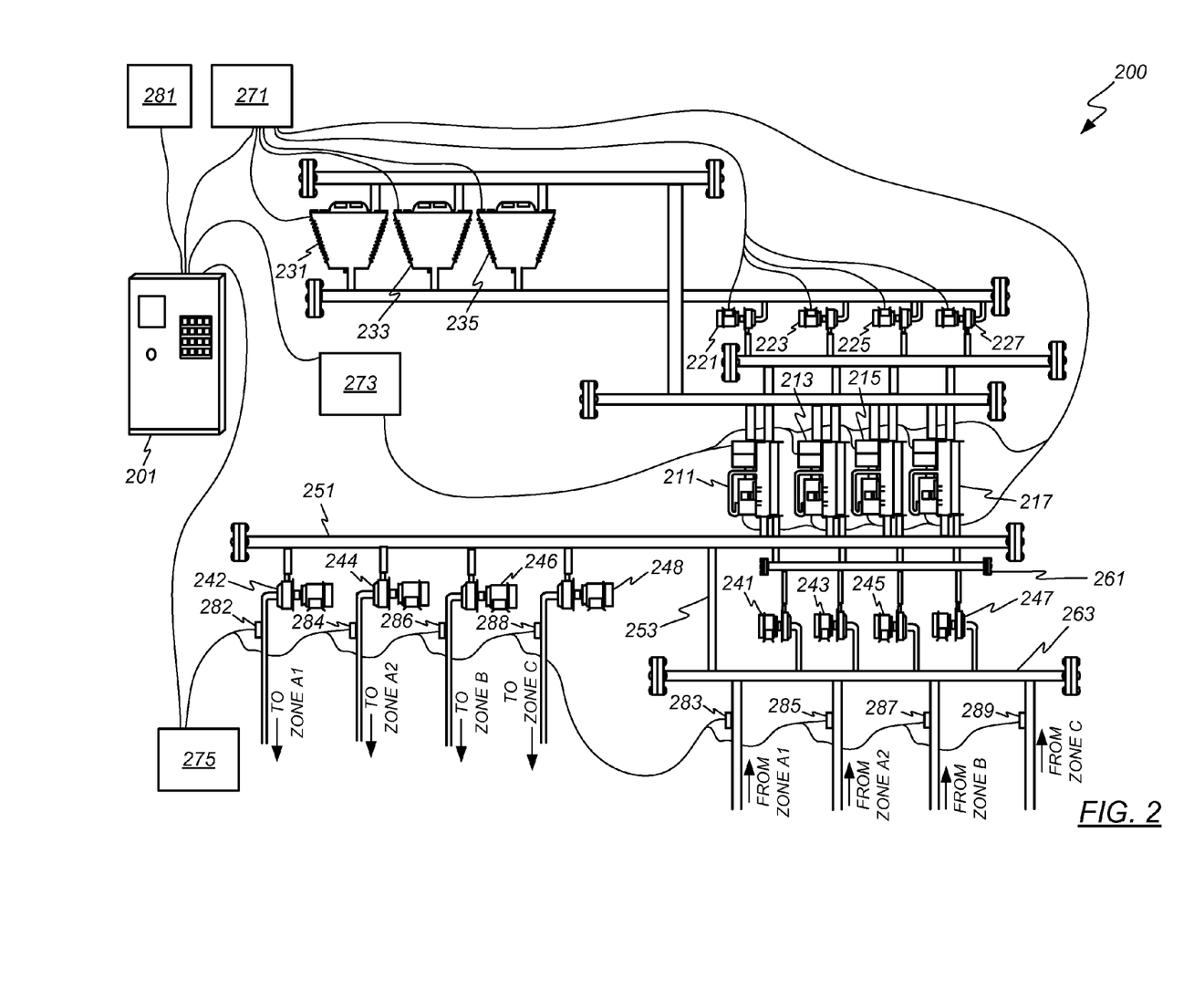
FIG. 2 depicts a central cooling and circulation system with an energy management controller device, according to an illustrative embodiment.

Many central cooling systems in central air conditioning systems are of two types: one is variable primary or primary only; the other is constant primary and variable secondary. Both of these types of central air conditioning systems may be used in various embodiments of this disclosure. Central cooling and circulation system 100 as depicted in FIG. 1 illustrates an example involving a variable primary or primary only system, while central cooling and circulation system 200 as depicted in FIG. 2 illustrates an example involving a constant primary and variable secondary system.

Central cooling and circulation system 100 may illustratively be discussed in terms of a set of specific descriptions of the features of the components thereof, with the understanding that this specific example is illustrative and not limiting of certain aspects of the disclosure.

The components described above of central cooling and circulation system 100 are referred to again as follows, in terms of specific characteristics of this illustrative example. Chilled water pumps 141, 143, 145, and 147, functioning as primary only pumps, may each be driven by a motor with a power of 75 kilowatts (kW). Chillers 111, 113, 115, and 117 may each have a load capacity of 500 tons, and each be driven by a motor with a power of 350 kW. Condenser water pumps 121, 123, 125, and 127 may each be driven by a motor with a power of 75 kW. Cooling towers 131, 133, and 135 may each have a load capacity of 1,000 tons, with fans driven by a motor with a power of 30 kW.

In an illustrative aspect of operation, chilled water that has been warmed by circulating through the target environment returns from the target environment through chilled water return header 161, carrying with it the removed heat from various parts of the target environment. The water is pumped by the chilled water pumps 141, 143, 145, and 147, via chillers 111, 113, 115, and 117 to the chilled water outgoing header 151 which circulates the chilled water back to the target environment, thus completing the chilled water circulation. The heat from the warmer chilled water is removed by the vaporizing refrigerant liquid in the evaporators of the chillers 111, 113, 115, and 117. The vaporized refrigerant from the evaporator is compressed in the compressor part of the chillers 111, 113, 115, and 117 to a high pressure so that the refrigerant can be condensed back to liquid form in the condenser part of the chillers 111, 113, 115, and 117. Water from one or more basins of the cooling towers 131, 133, and 135 is pumped to the condensers of chillers 111, 113, 115, and 117 by the condenser water pumps 121, 123, 125, and 127, to condense the high pressure refrigerant vapor to refrigerant liquid for recirculation.

In accordance with the specific characteristics listed above, central cooling and circulation system 100 in accordance with this example is designed for a peak load of 1,500 tons. However, the average load of the system is 600 tons. The minimum load is 300 tons.

Each of the 500 ton chillers 111, 113, 115, and 117 works in tandem with one of the chilled water pumps 141, 143, 145, and 147, one of the condenser water pumps 121, 123, 125, and 127, and at least one of the cooling towers 131, 133, and 135.

The following tables describe the design conditions of the installed central cooling and circulation system 100, in accordance with the specific characteristics given for the components of the system in this illustrative example, but without the operation of energy management controller device 101:

TABLE A.1

Chillers 111-114

| Chiller # | Make | Load capacity, tons | Refrigerant | Motor power, kW | kW/ton, at various capacities | | | |
|---|---|---|---|---|---|---|---|---|
| | | | | | 100% | 75% | 50% | 25% |
| 1 | A | 500 | R134a | 350 | 0.70 | 0.55 | 0.40 | 0.70 |
| 2 | B | 500 | R134a | 350 | 0.70 | 0.60 | 0.50 | 0.75 |
| 3 | C | 500 | R134a | 350 | 0.70 | 0.53 | 0.51 | 0.75 |
| 4 | D | 500 | R134a | 350 | 0.70 | 0.61 | 0.58 | 0.70 |

TABLE A.2

Chilled water pumps 141-144

| Pump # | Make | Flow rate capacity, GPM | Head, Feet | Motor Efficiency, η | Pump Efficiency, η | Motor power, kW |
|---|---|---|---|---|---|---|
| 1 | AP | 1,500 | 200 | 95% | 79% | 75 |
| 2 | AP | 1,500 | 200 | 93% | 80% | 75 |
| 3 | AP | 1,500 | 200 | 95% | 81% | 75 |
| 4 | AP | 1,500 | 200 | 96% | 80% | 75 |

TABLE A.3

Condenser water pumps 121-124

| Pump # | Make | Flow rate capacity, GPM | Head, Feet | Motor Efficiency, η | Pump Efficiency, η | Motor power, kW |
|---|---|---|---|---|---|---|
| 1 | AP | 2,000 | 150 | 95% | 79% | 75 |
| 2 | AP | 2,000 | 150 | 93% | 80% | 75 |
| 3 | AP | 2,000 | 150 | 95% | 81% | 75 |
| 4 | AP | 2,000 | 150 | 96% | 80% | 75 |

TABLE A.4

Cooling Towers 131-133

| Cooling Tower # | Make | Load capacity, Tons | Flow rate capacity, GPM | Type | Fan motor power, kW |
|---|---|---|---|---|---|
| 1 | BC | 1,000 | 4,000 | FD | 30 |
| 2 | BC | 1,000 | 4,000 | FD | 30 |
| 3 | BC | 1,000 | 4,000 | FD | 30 |

TABLE A.5 recorded or observed "kW/Ton" efficiencies for operating patterns of a central cooling and circulation system 100 in an illustrative embodiment:

| Load Pattern | Load, Tons | Power, kW | Hours/Year | lkW/Ton | Tons/Year | Energy Consumption, kWh/Year |
|---|---|---|---|---|---|---|
| Peak load | 1,200 | 1,460 | 400 | 1.217 | 480,000 | 584,000 |
| Average load | 600 | 930 | 6,000 | 1.550 | 3,600,000 | 5,580,000 |
| Minimum load | 300 | 480 | 2,360 | 1.600 | 708,000 | 1,132,800 |
| Total/year | | | | | 4,788,000 | 7,296,800 |
| Annual average Cooling Energy Efficiency | | | | 1.524 kW/Ton | | |

These results can be made much more efficient with the operation of energy management controller device 101, optionally along with any additional energy management cooling system components, in any combination. The comparative improvement in energy efficiency in this central cooling system 100 when operating central cooling system energy management controller device 101 in an illustrative embodiment is demonstrated further below, at the end of the description of FIGS. 3 and 4 and with Table 3.1.

Energy management controller device 101 may illustratively execute, using a processor, a control algorithm encoded as executable instructions stored on a memory element comprised in energy management controller device 101. Such a control algorithm may, in an illustrative embodiment, be flexibly applicable, such as to operate successfully with a range of central cooling systems including both a variable primary or primary only system such as cooling system 100 of FIG. 1 and a constant primary and variable secondary system such as cooling system 200 of FIG. 2, along with other system types and arrangements according to different embodiments.

Such additional energy management cooling system components that may work with cooling system energy management controller device 101 to facilitate the improved energy efficiency management of a central cooling system may illustratively be provided as integral parts of new central cooling systems or may be retrofitted onto existing central cooling systems, in any of a flexible variety of arrangements with different characteristics of energy efficiency management performance. Such additional energy management cooling system components may illustratively include any of the following, in any combination, in different embodiments: variable frequency drives (VFD) for the motors of any of the pumps, including the condenser water pumps 121-127 and the chilled water pumps 141-147; variable frequency drives for the motors of the fans for any of the cooling towers 131-135; variable frequency drives for the compressor motors for any of the chillers 111-117 if appropriate and feasible; pressure sensors for any of the discharge and return lines for any of the condenser water pumps 121-127 and the chilled water pumps 141-147; pressure sensors for the supply and return lines for the cooling coils of any of the air handling units, fresh air units, or other or other cooling transfer units (not depicted in FIGS. 1 and 2); temperature sensors for ambient temperatures, including wet bulb and dry bulb temperatures; refrigerant condensing temperature sensors for any of the chillers 111-117; evaporation temperature sensors for any of the chillers 111-117; condenser water inlet temperature sensors for any of the chillers 111-117; condenser water outlet temperature sensors for any of the chillers 111-117; chilled water inlet temperature sensors for any of the chillers 111-117; chilled water outlet temperature sensors for any of the chillers 111-117; chilled water outlet temperature sensors for the chilled water outgoing header 151; chilled water outlet temperature sensors for the chilled water return header 161; flow rate sensors for the chilled water outgoing header 151; flow rate sensors for the chilled water return header 161; and sensors for relative humidity of ambient air.

Each of the sensors indicated here may also include or be coupled with a transmitter or other means for communicating digital and/or analog data over a wired or wireless connection to cooling system energy management controller device 101. Of course it is understood that different embodiments do not require all of these components, or any particular ones of these components, and a wide variety of central cooling system elements and components may be used with different embodiments, none of which are limited to any particular one of these components.

For example, FIG. 1 illustratively depicts data relays 171 and 173 that illustratively collect various data over wired data connections from various components. Data relay 171 collects various data from chillers 111-117, condenser water pumps 121-127, and cooling towers 131-135, and relays it to cooling system energy management controller device 101. Data relay 173 also collects data over wired data connections from chillers 111-117 and relays it to energy management controller device 101. This additional data relay 173 is also wired to chillers 111-117 illustratively to gather different data from different sensors associated with chillers 111-117 than the data collected by sensors connected with data relay 171.

Cooling system 100 may also include ambient temperature sensor 181, chilled water outgoing header temperature sensor 183 attached to chilled water outgoing header 151, and chilled water return header temperature sensor 185 attached to chilled water return header 161. Temperature sensors 181, 183, 185 may have data connections with signal input connections of energy management controller device 101. These data connections are illustrated as wired connections in FIG. 1 but may take the form of any wired or wireless data connection. Additional sensors besides these illustrative examples may also be used anywhere throughout central cooling system 100 to sense temperature, pressure, flow rate, or any other relevant variable and convey data on such measured variables to energy management controller device 101, either directly or through a data relay or other intermediary component and with any combination of wired or wireless data connection, in various embodiments.

As indicated above, a variety of different sensors may collect data on a variety of different variables from any class of cooling system components, particularly from chillers 111-117, including data on refrigerant temperature, evaporation temperature, condenser water inlet temperature, condenser water outlet temperature, chilled water inlet temperature, and chilled water outlet temperature, as illustrative examples regarding chillers 111-117. The data connections between energy management controller device 101 and chillers 111-117 through data relays 171 and 173 may also function to relay control signal data back from energy management controller device 101 to chillers 111-117, illustratively such as rotational speed commands for variable frequency drives mated to the compressor motors for chillers 111-117, as indicated above.

One goal with the energy management controller device 101 is to reduce the overall energy the system uses per unit of cooling load, illustratively measured in IkW/ton, to an improved or optimum level for a particular central cooling system, whether a new system in which energy management controller device 101 is natively integrated or a pre-existing system in which energy management controller device 101 and potentially additional components are retrofitted with a pre-existing central cooling system. Energy management controller device 101 may be used to reduce the energy used per unit of cooling load for one or more components of cooling system equipment such as chillers, pumps, cooling towers etc., without compromising or inhibiting the cooling system's performance in maintaining a user-selected cooling load set by a user control, such as maintaining cooling of the target environment to a certain temperature.

In order to improve or optimize energy efficiency, a cushioning effect or factor of safety in terms of energy expended to achieve a desired cooling load may be reduced to a minimum practical level, while still ensuring no lapse in cooling performance in terms of delivering the amount of cooling needed to meet the user-selected temperature. Maintaining the user-selected performance or cooling load with a thinner margin of error in terms of energy per cooling load may be achieved by a nimble control feedback system, with ongoing "policing" or monitoring and controlling of the system. Various embodiments in accordance with the present disclosure accomplish that unlike any controls previously available.

Typically, central cooling and circulation systems have been designed for maximum load conditions. The cooling demand of a target environment is dependent on occupants and tasks. The demand load factor is generally 50-60% of the installed system.

Typical building management systems (BMS) and/or conventional cooling controllers do not generally include energy efficiency as a control option. Even those cooling system controllers which include features for energy efficiency, take a simplistic approach in which control is based on either the room temperature (human factor involved) or an outgoing chiller medium temperature.

Major energy consuming cooling system component equipment in a central chiller plant generally may illustratively include chillers, refrigerant compressors, chilled water circulation pumps, primary pumps, secondary pumps, condenser water pumps, and cooling tower fans. In one illustrative operational scenario in accordance with good engineering norms, the IkW of the individual cooling system components in a central cooling system, at full load and at partial load, may be as follows: chiller at full load: 0.55 to 0.7 kW/ton; chiller at partial load (50%): 0.30 to 0.45 kW/Ton; chilled water circulation pumps: 0.038 to 0.044 kW/Ton; condenser water pumps: 0.034 to 0.042 kW/Ton; cooling tower fans: 0.022 kW/Ton; range of overall IkW/Ton: 0.40 to 0.81 IkW/Ton.

A number of particular operational modes may be used or engaged by energy management controller device 101 to achieve energy efficiency objectives, and may illustratively include the following:

1. balancing the cooling load capacities of operating chillers, pumps, and cooling towers to match with the cooling demand;

2. volume controls of the refrigerant gas to the refrigerant compressor;

3. partial loading the chillers to take advantage of the improved energy efficiency at partial loads of the individual chillers;

4. maintaining the condenser approach, i.e. the difference between the refrigerant condensing temperature and condenser water outgoing temperatures, within a constrained range;

5. maintaining the evaporator approach i.e. the difference between the refrigerant evaporation and chilled water entry temperatures, within a constrained range;

6. effectively controlling the flow and pressure in the pumps to match with cooling load while at the same time meeting the system's dynamic frictional loss; and 7. effectively selecting the number of cooling towers to operate and controlling the cooling tower fan speeds to match with the cooling load and the ambient conditions.

These seven illustrative energy management methods are elaborated on below.

1. For actively controlling the central cooling system to run on a smaller safety margin in terms of energy per cooling load, it may be useful to balance the cooling load capacities of operating chillers, pumps, and cooling towers to match with the cooling demand, in various embodiments. In order to balance the cooling demand with the capacities of the chillers and circulating pumps, actual cooling load is measured dynamically, in this embodiment. This is in contrast to the majority of prior art chiller plant controls and management systems, which do not measure the cooling load, let alone control and optimize it.

A system of the present illustrative embodiment may measure the flow either directly through a flow meter or indirectly by the speed reference of the chilled water pumps and the capacities of the pumps. The capacities of the pumps may be validated by customization. Temperature transmitters installed may provide real time dynamic temperatures of supply and return water of the cooling fluid. Cooling load may be determined or otherwise determined by the formula: tons=(Flow in U.S. gallons per minute (USGPM)*difference between the outgoing chilled water temperature and the return chilled water temperature in Fahrenheit)/24.

Energy management controller device 101 may collect this information and make these calculations. After calculating the cooling load, energy management controller device 101 may choose a combination of chillers, pumps and cooling towers with the lowest IkW/Ton for the determined load. To do so, energy management controller device 101 may also consult an operational efficiency matrix, which may comprise a customized cooling component selection matrix that may be customized for a particular collection and arrangement of cooling system components in a given cooling system installation. The selection may be made based on a change of slope of "cooling load tons/sample time". The sample and response times may also be dynamically determined on a case to case basis.

2. Volume controls of the refrigerant gas to the refrigerant compressor may be used for energy efficiency, in various embodiments. The refrigerant compressors in the chillers typically consume a major portion of the energy in a central cooling plant. The energy consumption of any fluid compressor is proportional to the mass of the fluid compressed and the compression ratio. Built-in volume controls such as a slide valve in a screw compressor or the inlet guide vanes in a centrifugal compressor regulate the mass of refrigerant compressed. The mass of refrigerant to be compressed depends on the amount of refrigerant liquid evaporated in the evaporator, which in turn is proportional to the cooling load.

A majority of built-in volume controls in chiller units are set to operate based on the outgoing chilled water temperature of an individual chiller or a group of chillers. Some of the controls are based on return water temperature. In either case, if the actual dynamically measured temperature is higher than the set point, the volume controls will allow more mass of refrigerant gas to be compressed and vice versa. The temperature is generally set by the plant operator in order to maintain the temperature. In many chillers available in the market the set point can be adjusted remotely also.

Energy management controller device 101 may facilitate the volume control either locally or remotely by providing an automatic setting of the temperature(s) or an alarm. This way it does not interfere with built-in chiller controls, but makes use of them instead. Either outgoing chiller water temperature or return chiller water temperature are just one parameter of the cooling demand. The other parameters may include the mass (volume) of the refrigerant and the other temperature. Energy management controller device 101 may control by the enthalpy (total cooling to be provided by the refrigerant) and hence the control is more responsive and based on a partial parameter.

3. Partial loading of the chillers to take advantage of the improved "IkW/Ton" at partial loads of the individual chillers may be used by energy management controller device 101, in various embodiments. Chillers function more energy-efficiently at partial loads. This is mainly because of the higher condensing area and volume available for the refrigerant gas resulting in reduced condensing pressures. Condensing pressure influences the discharge pressure of the refrigerant gas compressor of the chiller. The lower the discharge pressure, the lower is the energy consumption.

Under the right circumstances, partial loading may be used without compromising the refrigeration effect or cooling performance of a chiller. Energy management controller device 101 may map the refrigeration effects of the chillers with energy efficiency and strike an optimum balance. The selection process of a combination of cooling system components for partial loading of the chillers may follow a similar sequence as that used for balancing the cooling load capacities of operating cooling system components to match with the cooling demand.

4. Maintaining the condenser approach (the difference between the refrigerant condensing temperature and condenser water outgoing temperatures in the cooling towers) within a constrained range or to a reasonable minimum may be used by energy management controller device 101, in various embodiments. As an illustrative example, energy management controller device 101 may maintain condenser approach at less than three degrees Fahrenheit (3° F.), in this illustrative embodiment. Other constrained ranges similar to this value will also work well, depending on the embodiment, and may for example be up to 5° F. or 10° F., or less than 3° F. such as only 2° F., depending on the scale and components of the central cooling system.

Energy management controller device 101 may dynamically seek to maintain a condenser approach of less than 3° F. for water or any other refrigerant medium by selecting the numbers and operational parameters of the condenser water pumps and cooling fans of the cooling towers or air cooled condensers. This is made possible by dynamically measuring the ambient dew point, also known as the wet bulb temperature, and the ambient temperature, also known as the dry bulb temperature, and mapping them with the built in refrigerant properties table, which may be part of the equipment data table stored within energy management controller device 101.

5. Maintaining the evaporator approach (the difference in temperatures of evaporating refrigerant liquid and the outgoing chilled water in the chillers) within a constrained range or to a reasonable minimum may be used by energy management controller device 101, in various embodiments. Energy management controller device 101 may maintain evaporator approach at less than one and a half degrees Fahrenheit (1.5° F.), in this illustrative embodiment. Energy management controller device 101 may dynamically seek to maintain the approach at less than 1.5° F. for any refrigerant medium through control signals to the chillers, in this illustrative embodiment. Energy management controller device 101 may also provide an audible alarm to an operator in addition to or instead of providing direct control signals, in different embodiments. Other constrained ranges similar to this value will also work well, depending on the embodiment, and may for example be up to 3° F. or 5° F., or less than 1.5° F. such as only 1.0° F., depending on the scale and components of the central cooling system.

6. Effectively controlling the flow and pressure in the pumps to match with cooling load while at the same time compensating for the system's dynamic frictional loss may be used by energy management controller device 101, in various embodiments. As noted above, in a central cooling system the cooling effect is transferred from the chiller plant to the point of use by a cooling transfer medium, such as water or ethylene glycol, for example. Pumps are an integral part of a central cooling system to circulate the chilled transfer medium fluid to the end use points in the target environment, such as AHUs in a building, for example, and back to the chiller.

The amount of water circulated depends on the cushioning in the operator-selected temperature difference between return chilled water and outgoing chilled water. For example, if an operator wants to maintain a temperature difference of eight degrees Fahrenheit (8.0° F.), the flow should be 3.0 USGPM (US Gallons per minute). For 500 tons cooling load the amount of water to be circulated (flow) should be 1,500 GPM. If the cooling demand is 400 tons, the flow should be 1,200 GPM.

If a variable frequency drive is used for the pump motor control, instead of a throttling valve at the discharge, enormous amount of pumping energy can be saved. The power consumed by a pump is dramatically reduced for relatively modest reductions in the rotational speed of the pump motor. Pump power is proportional to the cube of the rotational speed of the pump. So, for example, a one-third reduction in pump rotational speed provides a 70% reduction in power consumed.

For example, considering the illustrative example above in which chilled water pumps 141-144 have the properties listed in table A.2, a pump operating at full power and rated rotational speed uses 75 kW for full flow of 1,500 GPM. However, if the pump is run at 80% of its rated speed, for a flow of 1,200 GPM rather than 1,500, the power then required is equal to $(0.8)^3 = 0.512$ times its original value, so it is reduced to only 51.2% of its full power of 75 kW, i.e. to 38.4 kW.

Selectably controlling the rotational speed and power at which a pump operates may be done using one or more variable frequency drives (VFD). VFD's may be included with pumps in a cooling system and may be added as accessories if they had been lacking. Energy management controller device 101 may provide control signals to VFD's mated to the pumps to set pump rotational speeds according to determined values depending on calculations and other determinations made by the energy management controller device 101, thereby producing significant energy savings in central cooling system 100.

A potential constraint on reducing the flow with the VFD, that may need to be dealt with to reduce flow without affecting user-selected cooling performance, is the required pressure. The pressure varies in proportion to the square of the reduced speed, and may need to be kept above a minimum to be sufficient to overcome system resistance. The level to which the pressure can be reduced is a function of the dynamic frictional losses.

Typically, when VFD's are used at all, they are not controlled in a way that makes use of their true potential for energy efficiency as in this disclosure. For example, in a typical cooling system using a VFD, the VFD of a centrifugal pump may be controlled with a differential pressure switch irrespective of the system pressure requirements, which are dynamic. Energy management controller device 101 may include a customized program for dynamic trouble-shooting of existing individual equipment like the pumps and fans, which is also not found in typical cooling systems. Therefore, in many typical cooling systems an operator will have no choice except either to take a VFD offline or operate it at a constant speed. Consequently the energy saving is nil or negligible. In contrast, controller devices according to illustrative embodiments disclosed herein may be customized at the program design stage to dynamically determine the dynamic parameters such as pressure, frictional loss etc., and match with the characteristics of the compressors, pumps, fans, and the piping etc. while optimizing the supply energy efficiency.

The level to which the pressure can be reduced is a function of the dynamic frictional losses. Energy management controller device 101 according to illustrative embodiments may have, or be in operable communication with, a customizable pump performance template, as part of an equipment data table and/or an equipment and operational configuration table, for example. Using the pump performance template, energy management controller device 101 prevents the pump flow being reduced to below the critical speed even though the cooling load may otherwise warrant further reduction. This feature is unique to an energy management controller device as illustratively embodied herein and may guarantee sustainability of energy savings for the lifetime of the equipment.

7. Effectively selecting the number of cooling towers and controlling the cooling tower fans speeds to match with the cooling load and the ambient conditions may be used by energy management controller device 101, in various embodiments. An illustrative embodiment of a controller device may use resources such as an equipment data table and/or an equipment and operational configuration table and/or incoming sensor data signals and/or associated algorithms to select the number of cooling towers and/or the speed of fans (including an air cooled condenser) in operation, based on the ambient conditions, cooling tower efficiencies and design, and the condenser approach. Such resources may be included on a readable memory element within energy management controller device 101, or energy management controller device 101 may be configured in operable communication with such resources, according to different embodiments.

FIG. 2 depicts central cooling system 200, another illustrative embodiment of a central cooling and circulation system which illustratively differs from central cooling system 100 of FIG. 1 in that central cooling system 200 is a constant primary and variable secondary system. Central cooling system 200 includes secondary chilled water return header 263 in addition to primary chilled water return header 261; primary chilled water pumps 241, 243, 245, 247; chillers 211, 213, 215, 217; chilled water outgoing header 251; equalizer piping 253 connecting secondary chilled water return header 263 to chilled water outgoing header 251; four secondary chilled water pumps 242, 244, 246, 248, targeted for particular zones A1, A2, B and C of a target environment, respectively.

In an illustrative example of specific properties of the cooling system components, motors for water pumps 242, 244 for zones A1 and A2 are each of 25 kW, and motors for water pumps 246, 248 for zones B and C are each of 50 kW. Condenser water pumps 221, 223, 225, 227 may each be driven by a motor of 65 kW. Three cooling towers 231, 233, 235 may each be of 1000 tons cooling load capacity, and each with fans driven by motors of 20 kW. Chillers 211-217, condenser water pumps 221-227, and cooling towers 231-235 may be identical to chillers 111-117, condenser water pumps 131-137, and cooling towers 131-135 of FIG. 1, in this illustrative example.

Warmer chilled water returns from the zones A1, A2, B, and C of the building or other target environment carrying the removed heat from the respective zones in the chilled water return header item 2B. It is pumped to the chillers 211-217, by the primary chilled water pumps 241, 243, 245, 247. The chilled water is discharged from the chillers 211-217 to the suction header 251 i.e. chilled water outgoing header 251 for the secondary chilled water pumps 242, 244, 246, 248. The equalizer pipe 253 equalizes the pressure between the secondary return header 263 and the suction header 251 for the zonal secondary pumps 242, 244, 246, 248.

The heat from the warmer chilled water returning through primary chilled water pumps 241, 243, 245, 247 is removed by the vaporizing refrigerant liquid in the evaporator of the chillers 211-217. The vaporized refrigerant from the evaporator is compressed in the compressor part of the chillers 211-217 to a high pressure so that refrigerant can be condensed to liquid form in the condenser part of the chiller. Water from the basins of the cooling towers 231, 233, 235 is pumped to the condensers of the chillers 211-217 by the condenser water pumps 221, 223, 225, 227, to condense the high pressure refrigerant vapor to refrigerant liquid for recirculation.

In the illustrative example of FIG. 1 there are no secondary pumps. In the illustrative example in FIG. 2, the primary chilled water pumps 241, 243, 245, 247 pump the water through the chillers 211-217 only. The secondary pumps 242, 244, 246, 248 with their respective target zones each zone pump the chilled water to their respective zones. The secondary pumps' motors may also be fitted with variable frequency drives (VFD).

FIG. 2 illustratively depicts various sensors and data relays of cooling system 200, from among a wide variety of sensors and auxiliary data management components that may be employed in different embodiments. Temperature sensor 281 measures the temperature of the ambient air, and may also measure variables such as humidity and dew point, and conveys this data directly to energy management controller device 201. Chilled water outgoing header temperature and flow rate sensors 282, 284, 286, 288 are attached to pipes leading toward the indicated target environment zones from secondary chilled water pumps 242, 244, 246, 248, respectively, while chilled water return header temperature and flow rate sensors 283, 285, 287, 289 are attached to pipes leading back from the indicated target environment zones to primary chilled water pumps 241, 243, 245, 247, respectively. All eight of these header temperature sensors are shown relaying their data through data relay 275, while additional sensors (not individually depicted) attached to the chillers 211-217, condenser water pumps 221-227, and cooling towers 231-235 are shown transmitting their data through data relays 271 and 273. Any combination of sensors and data transmission and management components may be used in different embodiments.

In the illustrative example of FIG. 2, central cooling system 200 may be designed for a peak cooling load of 1,500 tons. Meanwhile, in this illustrative example, the average cooling load of the system is 600 tons, and the minimum cooling load is 300 tons. Each of the 500 ton chillers 211-217 works in tandem with one of the primary chilled water pumps 241, 243, 245, 247, one of the condenser water pumps 221, 223, 225, 227, and at least one of the cooling towers 231, 233, 235. All the secondary pumps may be generally run.

The following tables describe the illustrative design conditions of the installed system, in accordance with this illustrative embodiment. As noted above, chillers 211-217, condenser water pumps 221-227, and cooling towers 231-235 are identical to chillers 111-117, condenser water pumps 131-137, and cooling towers 131-135 of FIG. 1, and have the same design conditions as listed in Tables A.1, A.3, and A.4 above, respectively.

TABLE B.2

Primary chilled water pumps 241, 243, 245, 247

| Pump # | Make | Flow rate capacity, GPM | Head, Feet | Motor Efficiency, $\eta$ | Pump Efficiency, $\eta$ | Motor power, kW |
|---|---|---|---|---|---|---|
| 241 | AP | 1,500 | 50 | 95% | 79% | 20 |
| 243 | AP | 1,500 | 50 | 93% | 80% | 20 |
| 245 | AP | 1,500 | 50 | 95% | 81% | 20 |
| 247 | AP | 1,500 | 50 | 96% | 80% | 20 |

TABLE B.3

Secondary chilled water pumps 242, 244, 246, 248

| Pump # | Make | Flow rate capacity, GPM | Head, Feet | Motor Efficiency, $\eta$ | Pump Efficiency, $\eta$ | VFD Speed % | Motor power, kW | Actual power, kW |
|---|---|---|---|---|---|---|---|---|
| 242 | AP | 1,245 | 80 | 95% | 79% | 90% | 25 | 18 |
| 244 | AP | 1,234 | 80 | 93% | 80% | 85% | 25 | 15 |
| 246 | AP | 2,042 | 100 | 95% | 81% | 90% | 50 | 36 |
| 248 | AP | 2,038 | 100 | 96% | 80% | 95% | 50 | 43 |

TABLE B.6 recorded or observed "kW/Ton" efficiencies for operating patterns of a central cooling and circulation system 200 in an illustrative embodiment, prior to employing energy management controller device 201:

| Load Pattern | Load, Tons | Power, kW | Hours/ Year | IkW/ Ton | Tons/ Year | Energy Consumption, kWh/Year |
|---|---|---|---|---|---|---|
| Peak load | 1,200 | 1,447 | 400 | 1.206 | 480,000 | 578,800 |
| Average load | 600 | 932 | 6,000 | 1.553 | 3,600,000 | 5,592,000 |
| Minimum load | 300 | 587 | 2,360 | 1.957 | 708,000 | 1,385,320 |
| Total/year | | | | | 4,788,000 | 7,556,120 |
| Annual average Cooling Energy Efficiency | | | | | 1.578 kW/Ton | |

As this table shows, central cooling system 200 provides exactly the same amount of overall cooling performance in terms of cooling load per year as central cooling system 100 of FIG. 1, with slightly higher overall energy consumption in terms of kWh/year. The comparative improvement in energy efficiency in this central cooling system 200 when operating central cooling system energy management controller device 201 in an illustrative embodiment is demonstrated further below, at the end of the description of FIGS. 3 and 4 and with Table 3.1.

Figure 3:
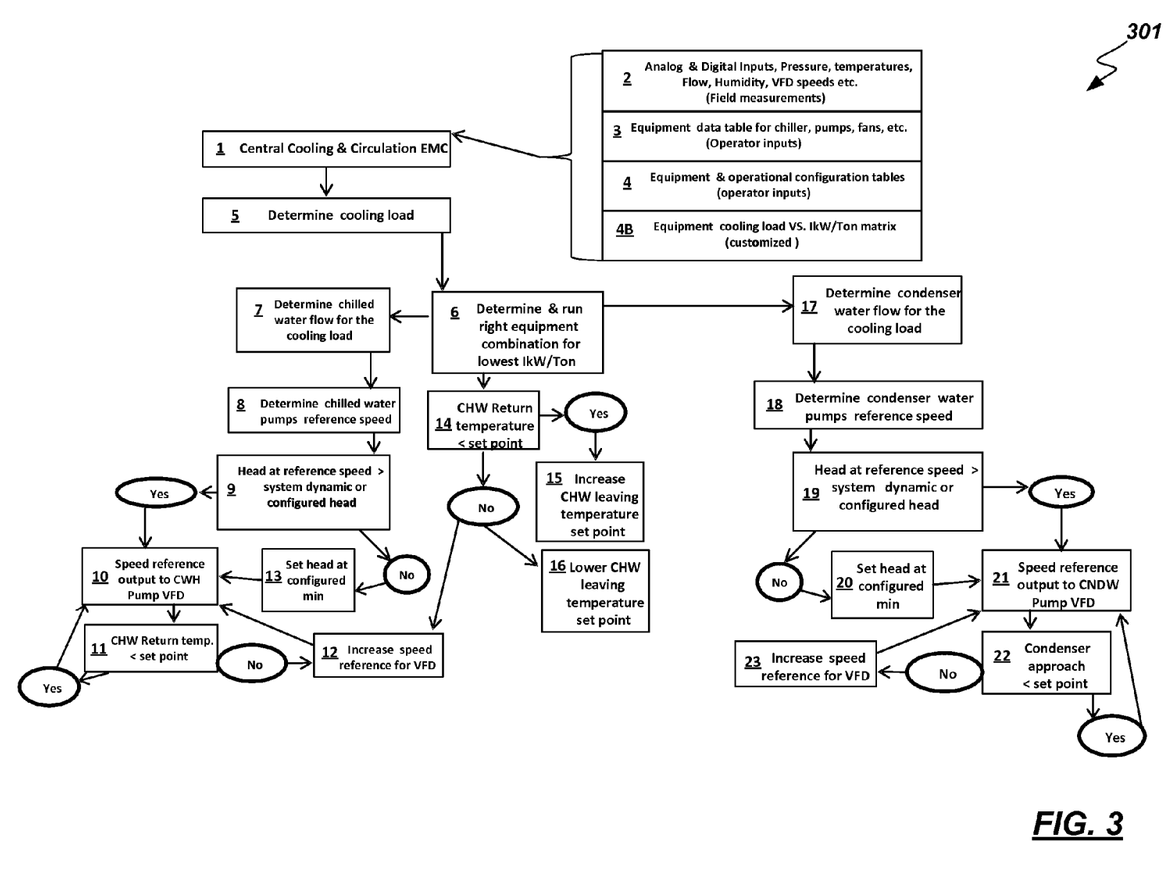
FIG. 3 depicts a block diagram for a central cooling and circulation energy management controller device, according to an illustrative embodiment.
Figure 4:
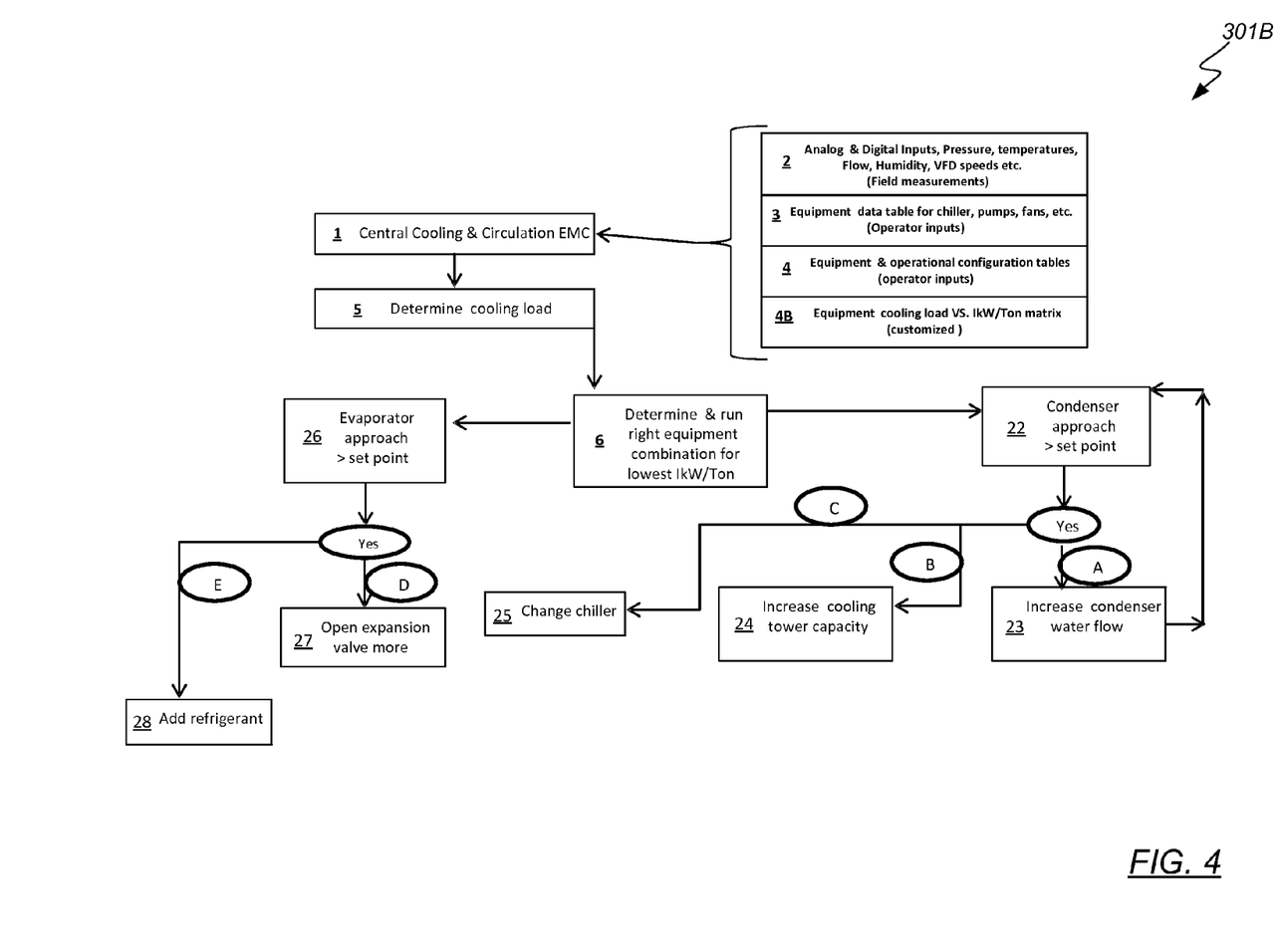
FIG. 4 depicts a block diagram for a central cooling and circulation energy management controller device, according to an illustrative embodiment.

FIGS. 3 and 4 provide block diagrams describing system elements and control functions included in the functioning of illustrative energy management controller 301 according to an illustrative example. Energy management controller 301 of FIG. 3 comprises main control panel 1 which houses a central processing unit, relays, power source, analog and digital input/output modules, and various other components.

Input block 2 is a set of analog and/or digital inputs which may receive and process various real time analog inputs such as the pressure, temperature, flow, humidity readings from the field, rotational speeds of one or more variable frequency drives, and other potentially measured variables, as part of receiving sensor inputs for making calculations for control signal outputs. One or more transmitters of pressure, temperatures, etc. (not depicted in FIG. 3) may transmit actual real time readings converted to analog signals to input block 2. Similarly, digital and Modbus signals may also be provided to input block 2, from field equipment components such as motors, control panels, variable frequency drives, and other potential components, which may convey information about rotational speeds or other relevant variables of the state of these components. Other combinations of inputs may be used with an input block in various embodiments.

In the illustrative embodiment of FIG. 3, table 3 is an equipment data table, with a list of cooling system component equipment and design specifications for the cooling system components. This information may be entered by a memory element by an operator, automatically or manually downloaded, or pre-loaded with the controller, for example.

Configuration table 4 is an equipment and operational configuration table, which may have configurational parameters and operational set points for the central cooling system, what components it has, and how the components are arranged. This information may be entered through a user interface with the control panel for the operator to enter, automatically or manually downloaded, or pre-loaded with the controller, for example.

Matrix 4A is an operational efficiency matrix, programmed with information for dynamic selection and operation of cooling system components, in this illustrative example.

Item 5 determines the cooling load real time from inputs from input block 2. Item 6 determines, selects, and runs the combination of equipment with the least energy usage per cooling load in IkW/Ton from an algorithm programmed in matrix 4A or that calls to or makes use of matrix 4A, for the real time cooling load determined by item 5, in an illustrative example.

Item 7 determines the chilled water flow required for the determined cooling load in item 5. Item 8 determines the reference speed for the VFDs fitted to the chilled water circulation. Item 9 determines if the head developed with the reference speed determined in item 8 is more than the system resistance determined by item 1 or the configured minimum head in configuration table 4. If it is more, the reference speed determined in item 8 is sent to item 11 as the speed reference to control the VFD of the chilled water pumps by item 10 accordingly. If it is less than configured minimum head, the speed corresponding to minimum head per item 13 is sent to item 11 as speed reference for the VFD control. Irrespective of the speed references by items 11 and 13, if the chilled water return temperature is less than the set point in item 4, the reference speed for item 11 is increased to meet the condition in item 13, in this illustrative example.

If, in spite of the above conditions being met, the chilled water return temperature is still higher than the set point in configuration table 4, the chilled water outgoing set point is lowered to load the one or more chillers further. If the chilled water return temperature is measured lower for a determined amount of time while all other conditions are met, then the chilled water outgoing temperature set point is raised per item 15 to reduce the loading of the one or more chillers, in this illustrative example.

Item 17 determines the condenser water flow for the cooling load determined in item 5. The same steps as those for the chilled water flow to maintain the minimum head, are followed in items 18 through 21 and 23. If the condenser approach as determined in item 22 is more than the set point in configuration table 4, condenser water flow is increased by increasing the speed of the VFD of the condenser pumps as determined by item 23 to meet the condenser approach temperature conditions in item 22, in this illustrative embodiment.

If all the above attempts to fail to bring the condenser approach temperature to what is configured in configuration table 4, then as the next priority the energy management controller 301 goes to the next step 23 as described in item 22 in FIG. 4 (with controller labeled as 301B to show different aspects thereof) to add one or more cooling towers, item 24 to the system to bring down the condenser approach temperature as configured in configuration table 4. If this attempt also fails to bring down the condenser approach to configuration table 4, then energy management controller 301 follows the next step in item 25 to change at least one of the one or more chillers, in this illustrative example.

If the evaporator approach is more than the set point as determined in item 26, then the signal item 27, which provides a control signal to open an expansion valve, is provided for manual or automatic operation. If the evaporator approach is still higher than in item 26, then the signal item 28 may be provided to add refrigerant either manually or automatically in various embodiments.

Energy management controller devices 101 and 201 of FIGS. 1 and 2 may employ the same or similar system elements or control functions, or engage one or more of the same operational modes, as energy management controller 301 of FIGS. 3 and 4, in an illustrative embodiment. An energy management controller in various embodiments of the present disclosure may effectively and actively sense and control the components of a central cooling system to operate the cooling system components at less than full power without inhibiting the cooling system from operating at a user-selected cooling load or affecting the user-selected cooling performance of the central cooling system, and with an improved or optimized energy efficiency, enabling the same cooling performance with the same cooling system with substantially less energy consumption.

The energy efficiency in terms of energy expended per cooling load, illustratively measured in IkW/ton, for an illustrative embodiment following the specific examples and details given above with reference to the examples of FIGS. 1-4, may illustratively result in improved energy efficiency as per the following table 3.1, with the installation of the controller 1 in an embodiment of this disclosure:

TABLE 3.1

| Load Pattern | Load, Tons | Power, kW | Hours/Year | 1kW/Ton | Tons/Year | Energy Consumption, kWh/Year |
|---|---|---|---|---|---|---|
| Peak load | 1,200 | 672 | 400 | 0.560 | 480,000 | 268,800 |
| Average load | 600 | 932 | 6,000 | 0.475 | 3,600,000 | 1,710,000 |
| Minimum load | 300 | 587 | 2,360 | 0.725 | 708,000 | 513,300 |
| Total/year | | | | | 4,788,000 | 2,492,100 |
| Annual average Cooling Energy Efficiency | | | | | | 0.520 kW/Ton |

As this table shows, a central cooling system 100 or 200 operating with a controller device 101 or 201 still provides the same amount of overall cooling performance in terms of cooling load per year as without the controller device, yet consuming much less energy in the process, only 0.520 kW/ton, compared with 1.524 kW/ton for system 100 and 1.578 kW/ton for system 200 operating without a controller device 101 or 201, a substantial improvement in energy efficiency.

Figure 5:
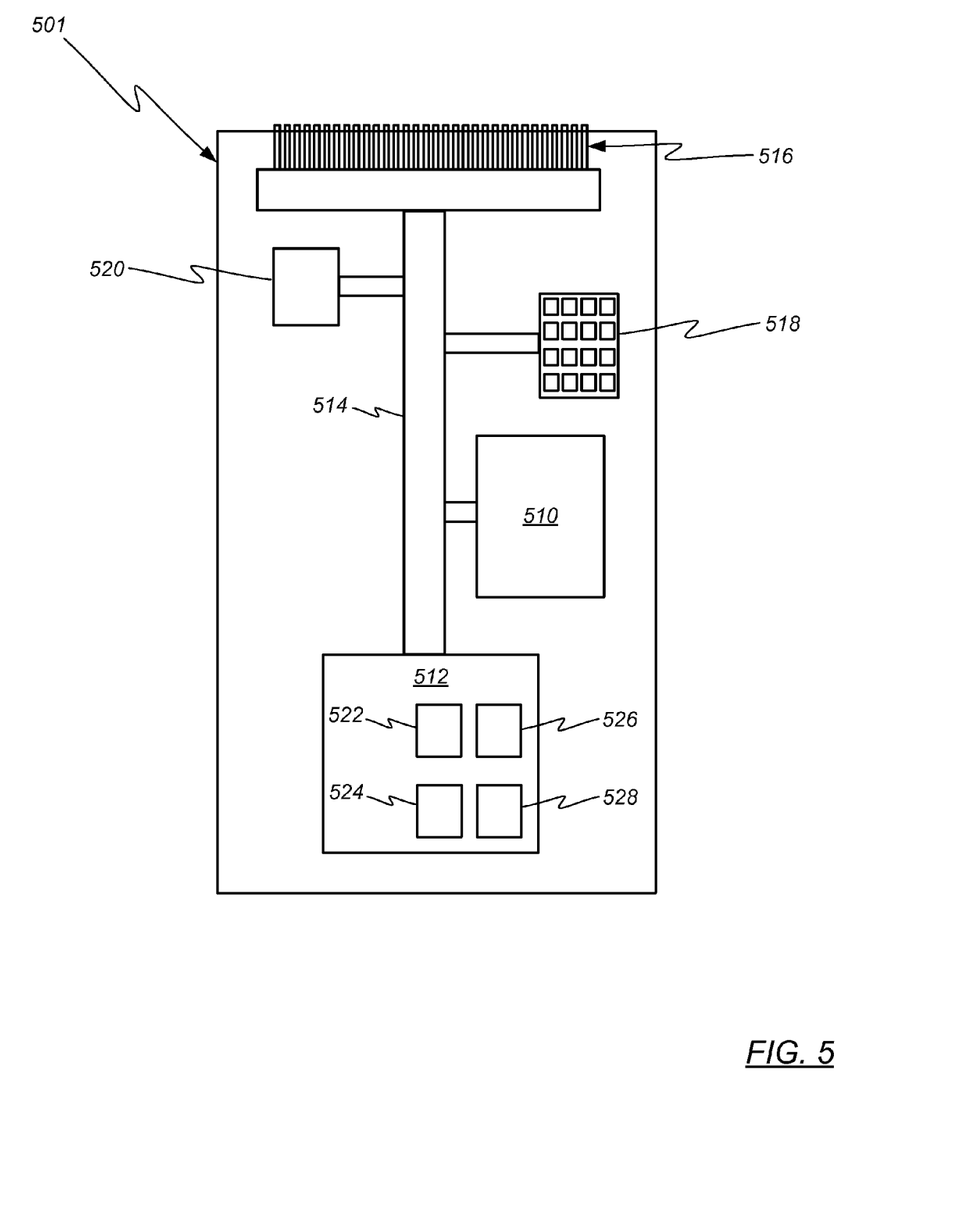
FIG. 5 depicts a block diagram of a central cooling and circulation energy management controller device, according to an illustrative embodiment.

FIG. 5 depicts block diagram 500 of a central cooling and circulation energy management controller device 501, according to an illustrative embodiment. Central cooling and circulation energy management controller device 501, which may be more simply referred to as controller device 501, in this illustrative embodiment, may include one or more signal connections 516; one or more electronic memory elements 512; and one or more processors 510, in operable communication via system bus 514 with the one or more signal connections 516 and the one or more electronic memory elements 512. Various embodiments of controller devices 101 and 201 may share any or all of the features and characteristics of controller device 501 according to this illustrative embodiment.

Signal connections 516 of central cooling controller 501 may be in operable communication with any of a wide variety of components, sensors, and other elements of a central cooling and circulation system, such as central cooling system 100 of FIG. 1 or central cooling system 200 of FIG. 2, for example. Signal connections 516 may thereby both transmit inputs from the system components, sensors, or other system elements to the central cooling controller 501, and transit outputs such as control signals to the components, sensors, or other system elements of the central cooling system. Signal connections 516 may provide for operable communication with any of the components, sensors, or other system elements by any format of either wired or wireless communication connection or protocol in accordance with different embodiments.

Electronic memory element 512 have stored thereon various resources accessible to processor 510. These resources may include an equipment data table 522, an equipment and operational configuration table 524, an operational efficiency matrix 526, and executable instructions 528. The executable instructions 528, when executed by processor 510, may configure processor 510 to perform any of the methods or method steps described herein, such as to determine operational control signals for improving energy efficiency of a central cooling system, illustratively such as central cooling system 100 of FIG. 1 or central cooling system 200 of FIG. 2. Electronic memory element 512 or one or more portions thereof may be partially or fully removable from controller device 101 or 201, and may be local to or remote from processor 510 or other portions of controller device 101 or 201, in various embodiments.

Executable instructions 528 may configure processor 510 to determine the operational control signals based on signals from the signal connections 516 and based on data from the equipment data table 522, the equipment and operational configuration table 524, and the operational efficiency matrix 526. Executable instructions 528 may further configure processor 510 to provide the operational control signals thus determined to the signal connections 516.

In different illustrative embodiments, processor 510 may be in the form of a central processing unit (CPU), an application-specific integrated circuit (ASIC), a field-programmable gate array (FPGA), a complex programmable logic device (CPLD), or any other type of electronic or other physical device capable of executing logic operations. Processor 510 may be configured with all necessary power connections, relays, contacts, and so forth.

Energy management controller 501 may also include various user interface components and connections, such as illustrative user input panel 518 and illustrative monitor 520. These are illustrative examples only and any type of input or output device may be included in different user interface components and connections, such as a hard-line or wireless data connection, a keyboard or key pad, a monitor, a trackpad, a mouse, a touch-interface monitor, or any other type.

The equipment data table and the equipment and operational configuration table may take the form of tables, arrays, databases, data stores, or any form of collection of data. Any form of data collection may be referred to as a table for the sake of simplicity, with the understanding that this may refer to any form of collection of data and is not limited to any given format.

Similarly, the operational efficiency matrix may be referred to as a matrix as a colloquialism with the understanding that this may include any format of indications of relationships of different system variables on system energy efficiency, and is not limited to other definitions or connotations from other fields of art such as pure math. For example, the operational efficiency matrix may take the form of information on the cooling loads of one or more elements of system equipment in relation to energy efficiency in a central cooling system, regardless of format.

Figure 6:
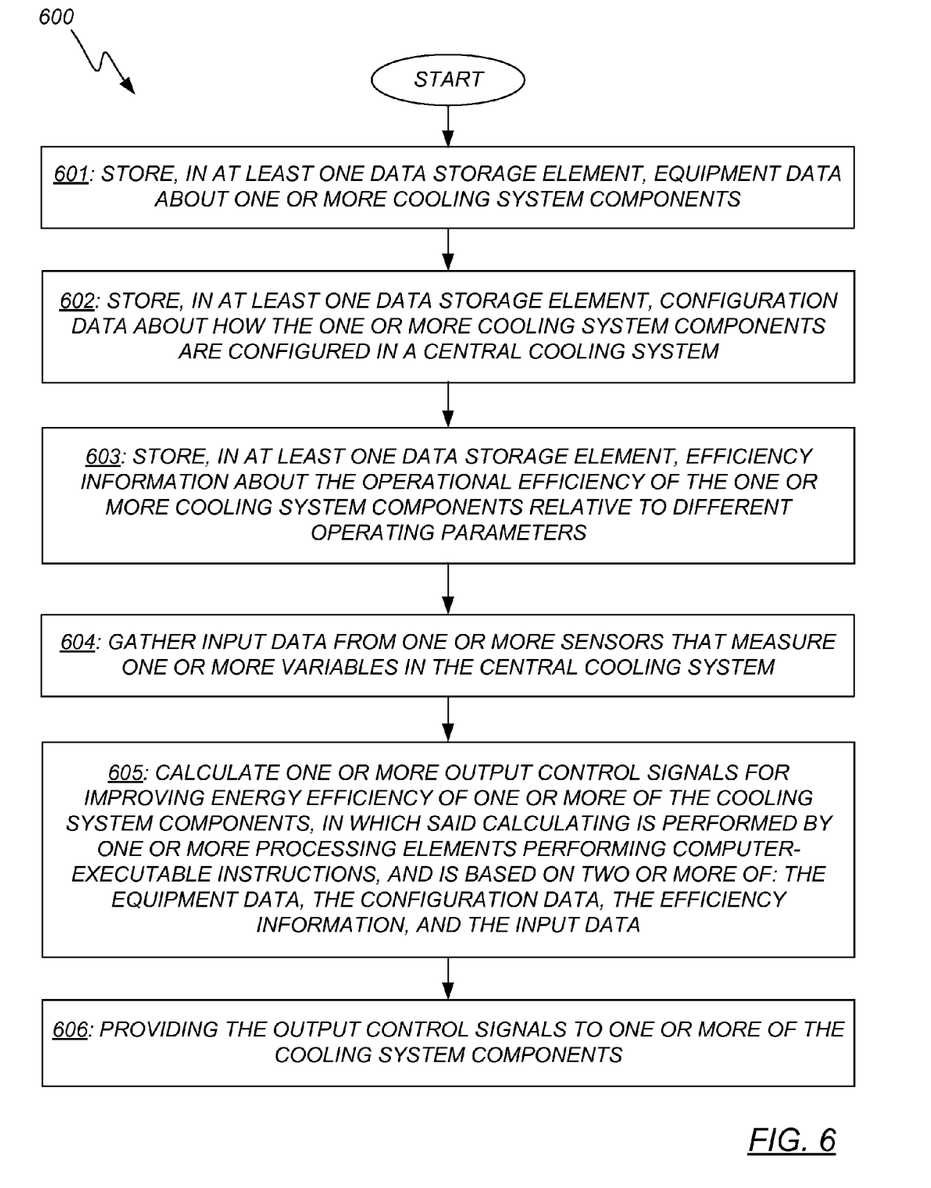
FIG. 6 depicts a flowchart for a method associated with a central cooling and circulation energy management controller device, according to an illustrative embodiment.

FIG. 6 depicts a flowchart for method 600 associated with a central cooling and circulation energy management controller, according to an illustrative embodiment. Method 600 provides an illustrative embodiment that in some respects is similar or complementary to various process steps described with reference to various embodiments throughout this disclosure. Method 600 provides one illustrative example of a method for using a central cooling energy management controller in a central cooling and circulation energy management control system, while a variety of other methods and method steps may also be used in various embodiments.

Method 600 includes step 601, of storing, in at least one data storage element, equipment data about one or more cooling system components. Step 602 is for storing, in at least one data storage element, configuration data about how the one or more cooling system components are configured in a central cooling system. Step 603 is for storing, in at least one data storage element, efficiency information about the operational efficiency of the one or more cooling system components relative to different operating parameters.

Step 604 is for gathering input data from one or more sensors that measure one or more variables in the central cooling system. Step 605 is for calculating one or more output control signals for improving energy efficiency of one or more of the cooling system components, in which said calculating is performed by one or more processing elements performing computer-executable instructions, and is based on two or more of: the equipment data, the configuration data, the efficiency information, and the input data. Step 606 is for providing the output control signals to one or more of the cooling system components. Additional or alternative process steps may also be used in other embodiments, including a variety of process steps and operational functions indicated with reference to various illustrative embodiments discussed above.

Although the subject matter has been described in language specific to certain illustrative structural features and/or methodological acts, it is to be understood that the subject matter defined in the appended claims is not limited to the specific illustrative features or steps described above. A broad variety of other cooling and energy management control systems, features and components may be included in various embodiments, for example. The elements defined by the claims may be embodied according to these and other innovative advances while still remaining consistent with and encompassed by the elements defined by the claims herein.

What is claimed is:

1. An apparatus comprising:
a controller device comprising:
one or more signal connections;
one or more electronic memory elements; and
one or more processors, in operable communication with the one or more signal connections and the one or more electronic memory elements;
in which the controller device has access to resources that are either stored on the one or more electronic memory elements or are accessible via the one or more signal connections, the resources comprising:
an equipment data table that comprises a list of components of a central cooling system and comprises data on characteristics of one or more of the individual ones of the components in the list;
an equipment and operational configuration table that comprises computational parameters and operational set points for the central cooling system;
an operational efficiency matrix that comprises information that relates different individual cooling load levels, including partial load levels and a full load level, of one or more of the components in the list to energy efficiency of the central cooling system; and
executable instructions which, when executed by the one or more processors, configure the one or more processors:
to dynamically compute an overall cooling load on the central cooling system based on real-time sensor inputs from the central cooling system received via the one or more signal connections;
to determine operational control signals for energy-efficient operation of the central cooling system, based on the sensor inputs from the central cooling system received via the one or more signal connections, and on data from the equipment data table, the equipment and operational configuration table, and the operational efficiency matrix, and on respective refrigerant properties from built in refrigerant tables, and on at least one of ambient temperature, relative humidity or ambient dew point; and
to provide the operational control signals via the one or more signal connections,
wherein the operational control signals comprise signals employed to:
select a number of components in the list to operate based on the dynamically computed overall cooling load and based on the information in the operational efficiency matrix that relates the different individual cooling load levels, including the partial load levels and the full load level, of the one or more of the components in the list to the energy efficiency of the central cooling system; and
selectively partially load one or more of the selected components based on partial load efficiencies of individual ones of the selected components to lower energy consumption in the central cooling system.

2. The apparatus of claim 1, in which the equipment data table stores data representing characteristics of one or more chillers, and of one or more condenser water pumps, and of one or more chilled water pumps, and of one or more cooling towers.

3. The apparatus of claim 2, in which the equipment data table comprises data on one or more of:
cooling load capacity of the one or more chillers;
motor power of the one or more chillers;
cooling load capacity of the one or more cooling towers;
flow rate capacity of the one or more cooling towers;
motor power of the one or more cooling towers;
flow rate capacity of the one or more condenser water pumps;
motor power of the one or more condenser water pumps;
flow rate capacity of the one or more chilled water pumps; and
motor power of the one or more chilled water pumps.

4. The apparatus of claim 1, in which the equipment and operational configuration table comprises data on how one or more cooling system components are installed in a central cooling system relative to the rest of the central cooling system.

5. The apparatus of claim 1, in which the equipment and operational configuration table comprises data on how many of each of one or more chillers, one or more condenser water pumps, one or more chilled water pumps, and one or more cooling towers, are installed and operational in a central cooling system, and how each of them are connected in the central cooling system.

6. The apparatus of claim 1, in which the processor is further configured to determine and to provide the operational control signals such that the signals control one or more cooling system components of the central cooling system including at least one of:
one or more chillers, one or more condenser water pumps, one or more chilled water pumps, and one or more cooling towers.

7. The apparatus of claim 6, in which the central cooling system provides user-selected cooling performance set by a user control, and in which the processor is further configured to determine and provide the operational control signals such that the signals control the one or more cooling system components in such a way that one or more of the cooling system components operates at less than full power, without inhibiting the central cooling system as a whole from operating at the user-selected cooling load.

8. The apparatus of claim 6, further comprising one or more variable frequency drives operably connected with one or more motors comprised in at least one of the one or more chillers, the one or more condenser water pumps, the one or more chilled water pumps, and the one or more cooling towers; and in which the executable instructions further configure the processor to determine operational control signals that comprise rotational speeds for the one or more variable frequency drives.

9. The apparatus of claim 6, in which the sensor inputs from the central cooling system comprise measurements of one or more of:
- pressure in discharge lines and return lines for the one or more condenser water pumps;
- pressure in discharge lines and return lines for the one or more chilled water pumps;
- pressure in supply lines and return lines for cooling coils in air handling units, fresh air units, or other cooling transfer units;
- refrigerant condensing temperatures of the one or more chillers;
- evaporation temperatures of the one or more chillers;
- condenser water inlet temperatures of the one or more chillers;
- condenser water outlet temperatures of the one or more chillers;
- chilled water inlet temperatures of the one or more chillers;
- chilled water outlet temperatures of the one or more chillers;
- chilled water outlet temperatures of one or more chilled water outgoing headers;
- chilled water outlet temperatures of one or more chilled water return headers;
- flow rates in one or more chilled water outgoing headers;
- flow rates in one or more chilled water return headers;
- temperature of ambient air; and
- relative humidity of ambient air.

10. The apparatus of claim 6, in which the processor is further configured to determine and to provide the operational control signals such that the signals control the one or more chilled water pumps comprising one or more primary chilled water pumps in fluid connection with the chillers and a chilled water return header, and one or more secondary chilled water pumps in fluid connection with the chillers and a chilled water outgoing header.

11. The apparatus of claim 6, in which the controller device is configured to provide operational control signals that control the cooling system components to engage one or more of the following operational modes:
- balancing cooling load capacities of operating cooling system components from among the one or more chillers, one or more condenser water pumps, one or more chilled water pumps, and one or more cooling towers, to match with cooling demand;
- controlling volume of refrigerant gas to a refrigerant compressor in the one or more chillers;
- partial loading the one or more chillers;
- maintaining a difference between refrigerant condensing temperature and condenser water outgoing temperature within a constrained range;
- maintaining a difference between refrigerant evaporation and chilled water outgoing temperatures within a constrained range;
- controlling flow and pressure in the one or more condenser water pumps and/or one or more chilled water pumps to match with cooling load while meeting dynamic frictional loss in the cooling system; and
- selecting a number of the cooling towers to operate and controlling fans of the cooling towers at speeds to match with a cooling load and ambient conditions.

12. The apparatus of claim 1 and further comprising the central cooling system, the central cooling system comprising:
- one or more chillers;
- one or more pumps, in fluid connection with the one or more chillers;
- one or more cooling towers, in fluid connection with the one or more pumps and the one or more chillers,
- wherein the controller device is in operable communication, via the one or more signal connections, with at least one of the one or more chillers, the one or more pumps, and the one or more cooling towers, and
- wherein the one or more electronic memory elements have stored thereon:
- system data associated with at least one of the one or more chillers, the one or more pumps, and the one or more cooling towers; and
- executable instructions which, when executed by the one or more processors, further configure the one or more processors to determine the operational control signals for operating the central cooling system with improved energy efficiency relative to running all of the pumps, chillers, and cooling towers at full power, in which said determining the operational control signals is based on signals from the one or more signal connections and on the stored system data, in which the executable instructions further configure the processor to provide the operational control signals to the signal connections.

13. The apparatus of claim 12, in which the one or more pumps comprise one or more condenser water pumps, in fluid connection with the one or more chillers and the one or more cooling towers; one or more return header chilled water pumps, in fluid connection with the one or more chillers and a return header; and one or more outgoing header chilled water pumps, in fluid connection with the one or more chillers and an outgoing header.

14. The apparatus of claim 12, further comprising one or more variable frequency drives operably connected with one or more motors comprised in at least one of the one or more chillers, the one or more condenser water pumps, the one or more chilled water pumps, and the one or more cooling towers, and the executable instructions further configure the one or more processors to determine operational control signals that comprise rotational speeds for the one or more variable frequency drives.

15. The apparatus of claim 12, in which the controller device is configured to provide operational control signals that control at least one of the one or more chillers, the one or more pumps, and the one or more cooling towers, to engage one or more of the following operational modes:
- balancing cooling load capacities of at least one of the one or more chillers and the one or more cooling towers to match with cooling demand;
- controlling volume of refrigerant gas to a refrigerant compressor in the one or more chillers;
- partial loading the one or more chillers;
- maintaining a difference between refrigerant condensing temperature and condenser water outgoing temperature within a constrained range of less than or equal to ten degrees Fahrenheit;
- maintaining a difference between refrigerant evaporation and chilled water entry temperatures within a constrained range of less than or equal to five degrees Fahrenheit;
- controlling flow and pressure in the one or more condenser water pumps and/or one or more chilled water pumps to match with cooling load while meeting dynamic frictional loss in the cooling system; and
- selecting a number of the cooling towers to operate and controlling fans of the cooling towers at speeds to match with a cooling load and ambient conditions.

* * * * *